Dec. 24, 1963 W. L. ROBB 3,115,393
PROCESS FOR BORON PRODUCTION
Filed April 25, 1961
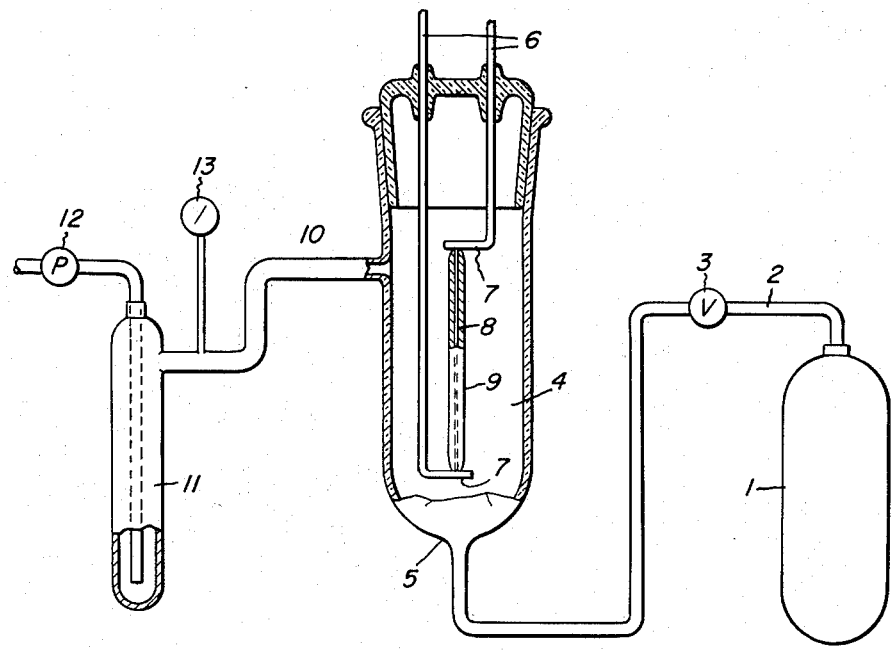
Inventor:
Walter L. Robb
by Joseph T. Cohen
His Attorney.

3,115,393
PROCESS FOR BORON PRODUCTION
Walter L. Robb, Scotia, N.Y., assignor to General Electric Company, a corporation of New York
Filed Apr. 25, 1961, Ser. No. 105,470
6 Claims. (Cl. 23—209)

This invention relates to a process of making high-purity elemental boron. More particularly, the invention is concerned with a process which comprises contacting an inert surface with a volatilized mixture of a boron hydride and a boron halide selected from the class consisting of $BCl_3$ and $BBr_3$ (hereinafter referred to as "boron halide") at a temperature at least as high as the decomposition temperature of the boron hydride, the said inert surface being substantially inert to the deposited boron, the boron hydride and the boron halide.

Although silicon and germanium in high-purity state are now used widely as semiconductor compositions, nevertheless, boron is now beginning to be recognized as a material, which in the highly purified state may also find many applicaitons in the semiconductor art. However, the means for obtaining integral high purity boron from boron halides are not as satisfactory as those available for obtaining high-purity silicon or germanium.

Unexpectedly, I have discovered a readily useful process for obtaining elemental pure boron from relatively inexpensive materials. In general, my process for making this high-purity boron involves decomposition of a boron halide of the above class in the presence of a boron hydride. Boron trichloride and boron tribromide are relatively cheap (in contrast to boron hydrides) and the ability to decompose a boron halide, particularly at relatively low temperatures makes this process attractive for making boron of high-purity.

Difficulty has been encountered in the past in effecting the decomposition of a boron halide, such as boron trichloride, and boron tribromide. This is due to the fact that in order to effect decomposition of the boron halide, in the presence of hydrogen as the reducing agent required to give the elemental boron of high-purity (hereinafter referred to as "pure boron"), elevated temperatures on the order of 1100 to 1200° C. are generally required. Still higher temperatures are required for the deposition of boron trifluoride. Although boron triiodide can be decomposed at reasonable temperatures, it is, however, the most expensive of the boron halides, and is the most difficult to purify to the state required for boron deposition useful in semiconductor applications. As far as is known, for optimum semiconducting properties, the boron is preferably a low temperature (about 800 to 1000° C.) rhombohederal crystal structure (known as "red boron") and to obtain such boron the temperature at which the boron halide is decomposed must be within the range of about 800 to 1000° C. Although one can deposit the desired boron readily by the decomposition of boron hydrides, the starting boron hydrides are so expensive that it would be highly desirable to find a process which would reduce the cost of the high purity boron.

Unexpectedly, I have discovered that by employing mixtures of a boron halide (both boron trichloride and boron tribromide may be used) with a boron hydride which is volatile at elevated temperatures, and if this mixture is heated or brought in contact with an inert surface maintained at a temperature which is at least as high as the decomposition temperature of the boron hydride, it is possible to effect decomposition of the boron halide and also of the boron hydride to form high-purity boron which is then deposited on an inert surface which comes in contact with the boron being released from the decomposition of boron hydride and the boron halide. The temperatures at which this decomposition of the boron halide can take place is much lower than the temperatures at which boron halides ordinarily decompose and is within the necessary range of about 800 to 1000° C. at which the more desirable red boron is formed.

The boron hydride which is employed in the practice of the present invention can be either a liquid, solid or gas as long as it is capable of being volatilized at elevated temperatures so as to decompose in the presence of the boron halide. As the boron hydride decomposes, this forms a nascent hydrogen which is highly reactive with the boron halide promptly reducing the boron halide to essentially pure boron which is then allowed to deposit on an inert surface. The decomposing boron hydride also deposits a proportional share of high-purity boron. Included in the boron hydrides which may be employed are, for instance, diborane ($B_2H_6$), tetraborane ($B_4H_{10}$), pentaborane ($B_5H_9$), dihydropentaborane ($B_5H_{11}$), decaborane ($B_{10}H_{14}$), etc.

The inert surface which is used on which to deposit the pure boron is one which is inert not only to the boron being deposited but also is inert to either the boron hydride or the boron halide. Included among such inert surfaces (in tube, rod, bar, ribbon, etc., form) may be mentioned, for instance, tantalum, titanium, zirconium, boron nitride, etc. Inert surfaces offering sources of contamination, such as quartz, etc., should be avoided as the inert surface.

In carrying out my process, it is necessary to first bring together the boron hydride and the boron halide, preferably under pressure and thereafter lead said mixture of materials in the gaseous form into a deposition chamber in which a wire or other inert surface is maintained at a temperature above 800° C. and advantageously within the range of from about 800 to 1000° C. while maintaining a reduced pressure. The inert surface, advantageously in the form of a wire or rod, is brought up to the desired temperature by means of electrical resistance (or heated by induction, or by radiation, etc.) and is present in the zone in which the mixture of the boron hydride and boron halide gases are brought together. As the mixture of the boron hydride and boron halide comes in contact with the heated inert surface, such as the heated wire, the boron hydride decomposes giving off nascent hydrogen which, in turn, reduces the boron halide to pure boron which is then deposited on the inert surface. The process whereby the boron hydride and the boron halide are brought in contact with the heated inert surface provides a convenient means for a continuous process for making pure boron and also for making thick sections of pure boron by building up, on the inert surface, continuous layers of the boron being deposited as the mixture of the boron hydride and the boron halide comes in contact with the heated surface.

Thereafter, the high-purity boron adhered to the inert surface can be removed either mechanically or by means of etching or dissolving away the inert surface with a suitable acid (e.g., hydrochloric, hydrofluoric, etc., acids) leaving behind a hollow tube of solid high-purity boron. If one desires boron chips, the boron can easily be cracked from the inert surface leaving only a thin boride layer adherent to the filament.

A suitable appartus for carrying out the decomposition of the boron halide with the boron hydride is found in the accompanying drawing in which the single FIGURE shows an apparatus which can be used and actually was used in depositing high-purity boron in the manner described in the examples which follow.

In the attached figure, the boron halide and the boron hydride are mixed together in a high pressure cylinder 1. The mixture of the boron halide and the boron hydride is led through piping 2 in which the flow of boron halide and boron hydride is controlled by a valve 3 into a deposition chamber 4. The deposition chamber is advantgeously made of Pyrex whose walls are cooled by circulating water through a surrounding jacket (not shown), this being important in order to prevent the formation of solid boron hydride polymers on the wall of the deposition chamber. Although the deposition chamber shows bringing in the mixture of boron hydride and boron halide through the bottom of the chamber 5, it will be apparent that the vapors could be brought in at either end or at the middle of the chamber, or at several points. By arranging the flow of the vapors of boron hydride and boron halide, and by periodically changing the direction of gas flow, rods with near uniform diameters can be produced.

Inside the deposition cell are two wire electrodes 6 formed of an electrically conducting material, such as brass, copper, etc. These electrodes by means of electrically conducting bars 7 support the inert surface in the form of a wire 8 which is heated to temperatures of 800° C. and higher by means of resistance heating. As the reduction of the boron halide and the boron hydride continues, pure boron 9 will deposit on the heated wire 8. The volatile products and unreacted boron halide and boron hydride are then removed through an outlet pipe 10 which leads into a cold trap 11 for the purpose of condensing the unreacted boron hydride and boron halide. The flow of boron halide and boron hydride into the deposition chamber and the ultimate removal of volatile products including volatile reactants is accomplished by a vacuum pump 12 which is attached to the cold trap. The flow of volatile products as a result of applying a vacuum is controlled by means of an Alphatron gauge 13 shown in the attached figure.

Thereafter, having accomplished the reaction between the inert heated surface and of the mixture of the boron hydride and the boron halide, any boron hydride or boron halide which failed to decompose or react can be readily recycled for further reaction with the heated surface. This permits a continuous process whereby full realization of yields from both the boron hydride and the boron halide can be realized.

In order that those skilled in the art can better understand how the present invention is practiced, the following examples are given by way of illustration and not by way of limitation. In the examples, the apparatus used to carry out the reaction was that described in the attached drawing.

*Example 1*

In this example, diborane and boron trichloride, in the molar ratio of 1 mole of the former and two moles of the latter were mixed together in the high pressure cylinder and the mixed gas was then introduced continuously for 40 minutes into the deposition cell shown in the attached drawing. The inert surface in the deposition cell was a tantalum wire about 30 mills in diameter and about 9 inches long raised to temperature by resistance heating. The wire was maintained at a temperature within the range of about 950 to 1000° C. The gas pressure in the deposition chamber was maintained at about 60 microns mercury pressure by a liquid nitrogen trap and a vacuum pump as shown in the attached drawing. The amount of boron depositing on the wire and the amount of gas leaving the deposition cell were measured and from this data one could calculate the amount of diborane and boron trichloride which decomposed to form the boron metal. These calculations revealed that for each mole of diborane and each two moles of boron trichloride used in the feed or mix, approximately 1.5 moles boron had deposited. It was further determined that 52.5% of the diborane had decomposed and 24.1% of the boron trichloride had decomposed. The unreacted ingredients (after removal of any HCl) could be recycled and brought into contact again with the heated inert wire.

To exemplify what would happen if instead of using the boron hydride and the boron halide, one had used hydrogen with the boron halide, the following test was carried out.

*Example 2*

In this example, the same conditions of reaction were carried out as in Example 1 with the exception that diborane was omitted and the molar ratio of boron trichloride to hydrogen in the feed was 1 to 1.5. The amount of hydrogen used was calculated as being comparable to that formed if all of the diborane in the Example 1 had decomposed. After carrying out the reaction similarly as in Example 1, but this time for 1 hour, no detectable amount of boron was deposited, establishing clearly that under the deposition conditions used in Example 1, molecular hydrogen was not a sufficiently strong reducing agent to reduce the boron trichloride. Even when the tantalum filament used for the purpose of depositing boron thereon was first coated with boron before contacting the latter with the mixture of the boron trichloride and the hydrogen, still no additional boron was found deposited thereon. This established clearly that the boron hydride, particularly the diborane in Example 1, had an important part in the low temperature, low pressure reduction of the boron halide to deposit essentially pure boron.

It will, of course, be apparent to those skilled in the art, that instead of using the boron trichloride or diborane employed in the foregoing examples, boron tribromide and other boron hydrides may be used, many examples of which have been given above, without departing from the scope of the invention. The inert surface can also be varied widely as long as it does not interfere with the reduction reaction, nor does it in any way adversely react with either the deposited boron, the boron hydride or the boron halide used. Obviously, the conditions of reaction (including the temperature conditions) may also be greatly varied, and the means of introducing the boron halide and the boron hydride may be varied within the scope of my process.

The above means for depositing boron can also be used in lining neutron counter tubes used in atomic energy applications.

What I claim as new and desire to secure by Letters Patent of the United States is:

1. The process for making readily recoverable high-purity elemental boron which comprises contacting an inert surface with a volatilized mixture of a boron hydride and a boron halide selected from the class consisting of boron trichloride and boron tribromide at a temperature at least as high as the decomposition temperature of the boron hydride, whereby elemental boron is formed both (1) through the decomposition of said boron hydride and (2) by the reduction of said boron halide by nascent hydrogen released by said hydride decomposition, and thereafter removing the formed boron from the inert surface.

2. The process as in claim 1 in which the boron hydride is selected from the class consisting of diborane, tetraborane, pentaborane, dihydropentaborane, and decaborane.

3. The process for making readily recoverable high-purity elemental boron which comprises contacting an inert surface with a volatilized mixture of boron trichloride and diborane where in the inert surface is maintained at a temperature at least as high as the decomposition temperature of the diborane, whereby elemental boron is formed both (1) through the decomposition of said boron hydride and (2) by the reduction of said boron halide by nascent hydrogen released by said hydride decomposition, and thereafter removing the boron from contact with said inert surface.

4. The process for making readily recoverable high-purity elemental boron which comprises contacting an inert surface with a volatilized mixture of boron tribromide and diborane wherein the inert surface is maintained at a temperature at least as high as the decomposition temperature of the diborane, whereby elemental boron is formed both (1) through the decomposition of said boron hydride and (2) by the reduction of said boron halide by nascent hydrogen released by said hydride decomposition, and thereafter removing the boron from contact with said inert surface.

5. The process as in claim 3 wherein the temperature is at least 800° C.

6. The process as in claim 4 wherein the temperature is at least 800° C.

References Cited in the file of this patent
UNITED STATES PATENTS

| | | |
|---|---|---|
| 2,307,005 | Ruben | Dec. 29, 1942 |
| 2,839,367 | Stern et al. | June 17, 1958 |
| 2,854,353 | Schwope | Sept. 30, 1958 |